P. PUBLICKER.
HIGH PROOF WATER COOLED SPIRIT DISTILLING COLUMN.
APPLICATION FILED MAY 9, 1914.
1,109,701.
Patented Sept. 8, 1914.
2 SHEETS—SHEET 1.
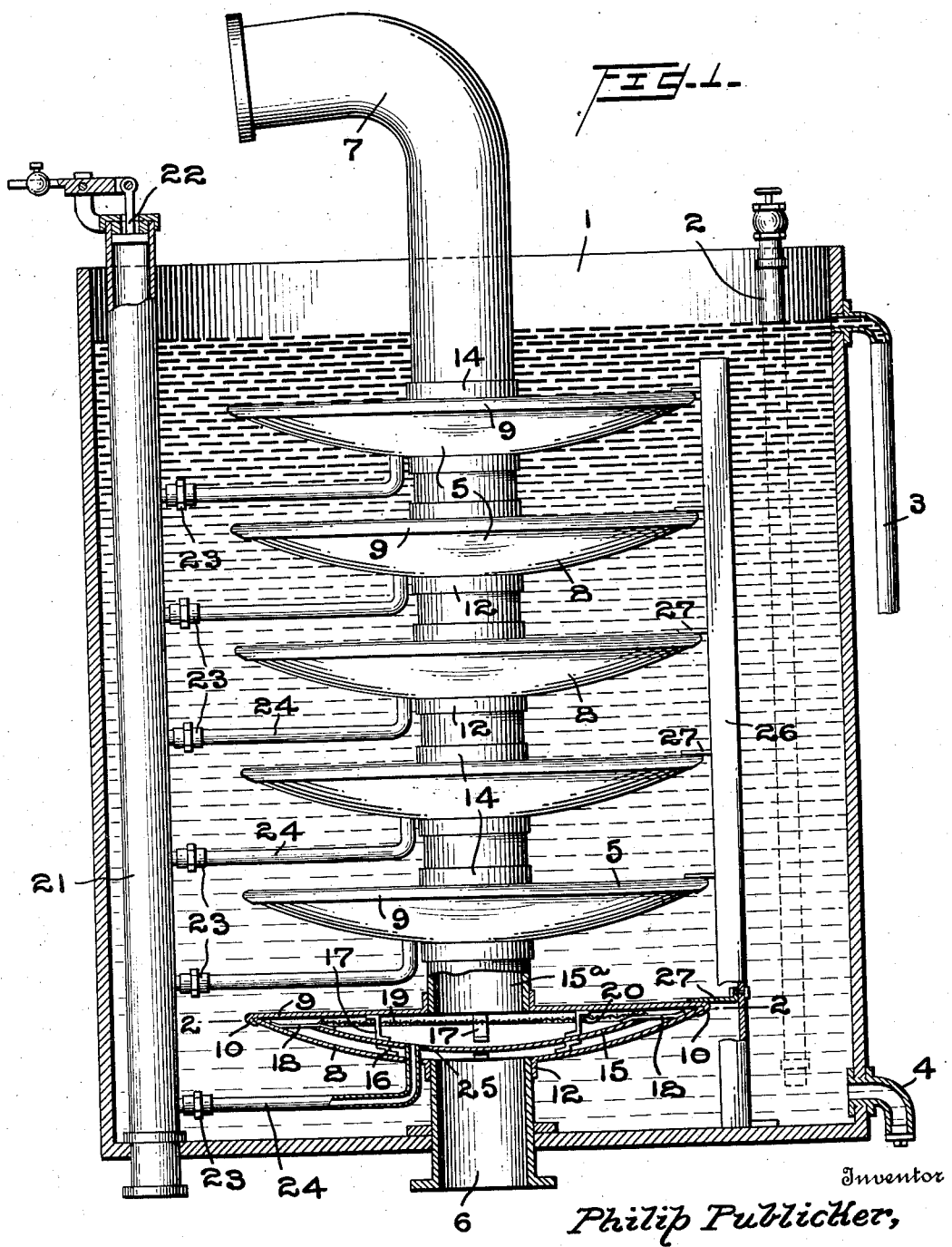

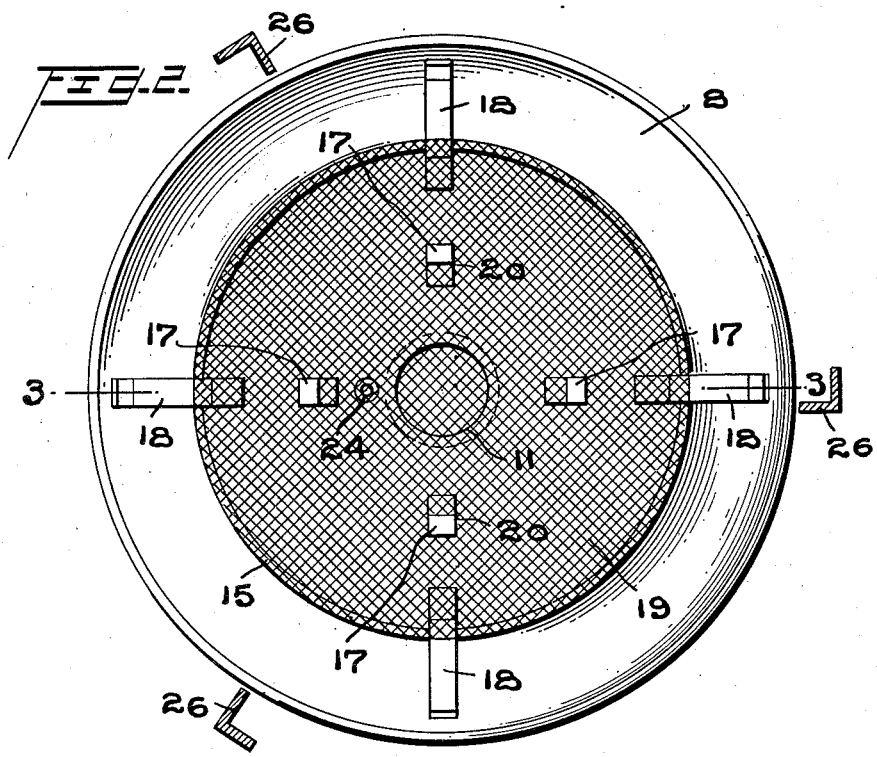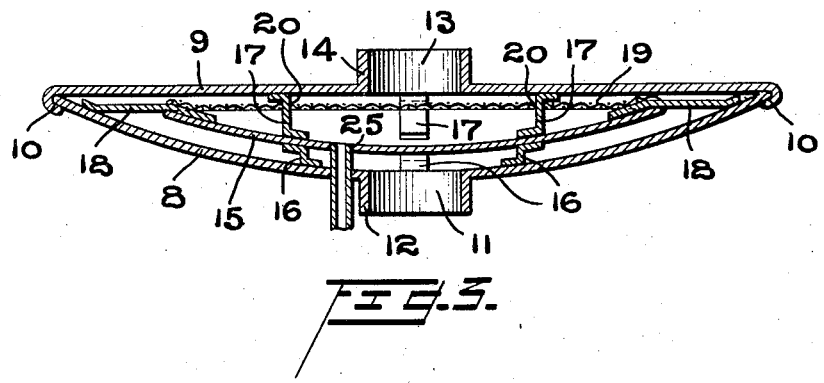

UNITED STATES PATENT OFFICE.

PHILIP PUBLICKER, OF PHILADELPHIA, PENNSYLVANIA.

HIGH-PROOF WATER-COOLED SPIRIT-DISTILLING COLUMN.

1,109,701. Specification of Letters Patent. Patented Sept. 8, 1914.

Application filed May 9, 1914. Serial No. 837,520.

*To all whom it may concern:*

Be it known that I, PHILIP PUBLICKER, a citizen of the United States, residing at Philadelphia, in the county of Philadelphia and State of Pennsylvania, have invented certain new and useful Improvements in High-Proof Water-Cooled Spirit-Distilling Columns, of which the following is a specification.

My invention relates to improvements in high-proof water-cooled spirit distilling columns, the object of the invention being to provide a column composed of a vertical series of superimposed units, all immersed in a body of water, and each unit containing a pan which performs the double function of a receptacle to collect the distillate and a condensing surface against which the vapor is compelled to flow and condense thereupon.

A further object is to provide a column of the character stated having an improved arrangement of parts, whereby the several units are braced and strengthened against the pressure of water, and in which the several parts are securely held so as to maintain them in proper relative positions.

A further object is to provide in a column of the character stated, an improved arrangement of screened pan for collecting the distillate and connect all of the pans of the several units with a manifold pipe having a vacuum valve at its upper end, so that the distillate may freely flow back to the boiler for vaporization or to any other point of discharge.

With these and other objects in view, the invention consists in certain novel features of construction and combinations and arrangements of parts as will be more fully hereinafter described and pointed out in the claims.

In the accompanying drawings: Figure 1 is a view partly in elevation and partly in vertical section illustrating my improvements. Fig. 2 is a view in horizontal section on an enlarged scale on the line 2—2 of Fig. 1, the cover of the unit being removed. Fig. 3 is a view in section on the line 3—3 of Fig. 2.

1 represents a receptacle for water which I have illustrated as provided with a sup-pipe 2, an overflow pipe 3, and a drain pipe 4, although these details may, of course, be varied to suit conditions.

Located within the receptacle 1, is my improved column which consists of a vertical series of units 5, the lowermost unit 5 being connected by an inlet pipe 6 with the boiler, so that the vapor rises through the column, and the uppermost column being provided with an outlet pipe 7 as clearly shown. All of the units are precisely alike, and hence the description hereinafter of one, will apply alike to all.

Each unit 5 has a concavo-convex bottom 8 with a flat top 9 secured thereto, the outer edges of the top being bent over and inclosing the edge of the bottom as shown clearly at 10 to form a tight juncture. The bottom 8 has a central inlet opening 11 with a collar 12 around the same, and the top 9 has an outlet opening 13 with a collar 14 around the same. The collars 12 and 14 of the respective units are secured around coupling pipes $15^a$, all of said coupling pipes being in alinement so that the several units are located one directly above the other. Each unit 5 is provided with a concavo-convex pan 15 which is curved concentrically with the bottom 8 and is appreciably smaller than the bottom 8 so as to provide a uniform space all around the edge of the pan for the passage of vapor. The pan 8 is supported by a series of angle brackets 16 secured to the upper surface of the bottom and to the lower surface of the pan. Above these brackets 16, other brackets 17 are located and connect the upper surface of the pan 15 with the top 9. By means of this arrangement of alined brackets, the walls of the unit are strengthened against collapse by reason of pressure of water, and the parts are rigidly maintained in proper relative position. To further insure a proper positioning of the pan within the unit, I provide a series of straps 18 which connect the edges of the pan with the bottom 8 as clearly shown.

Over the pans 15 in the units 5, I locate screens 19, said screens being flat as indicated with their edges secured to the edges of the pan and having openings 20 therein through which the brackets 17 above referred to are projected.

21 represents a manifold pipe which is provided at its upper end with a vacuum valve 22, and at its lower end is connected to the boiler for the return of the distillate or to any suitable receptacle (not shown). The manifold pipe 21 is connected by couplings 23 with branch pipes 24. These branch pipes 24 extend through the bottoms 8 of the several units, and are secured in openings 25 in the pans 15, and permit the distillate collecting in the pans to drain into the manifold pipe.

Each of the units above described constitutes a condensing chamber which is of considerable area subjected throughout to the cooling action of the water, so that I secure a rapid condensation.

To strengthen the column and hold the several units against independent movement, I provide a series of vertical angle bars 26 which are supported on the bottom of receptacle 1, and are secured by straps 27 to the several units.

The operation is as follows: The vapor from the boiler passes upwardly through the inlet 6 at the lower end of the column, and flows around the pan 15 in the lowest unit 5, thence upward against the bottom of the pan 15 in the unit above, and so on throughout the column. The vapor condenses against the bottom of the pan 15, and against the top 9 of each unit, and the distillate thus forming in drops, falls into the pans through the screens 19, so that the distillate is thoroughly screened before it collects in the pan. From the pans, the distillate flows through the pipes 24 to the manifold 21.

By constructing units such as above described, the parts are maintained in relative position, and the walls of the unit are strengthened by the brackets 16 and 17, so that there can be no collapse from the pressure of water.

It will be noted that the outlet pipe 7 is bent at an angle, so that any condensation within this pipe beyond a certain point will not return to the column, but will flow through the pipe to its point of discharge.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A column of the character described, comprising a vertical series of super-imposed units, each unit having a pan therein, a manifold pipe communicating with all of the pans, and each pan having a screen over the top thereof through which the distillate is compelled to pass before collecting in the pan, substantially as described.

2. A column of the character described, comprising a vertical series of super-imposed units, each unit having a pan therein, a manifold pipe communicating with all of the pans, and each pan having a screen over the top thereof through which the distillate is compelled to pass before collecting in the pan, brackets connecting the bottoms of the pans with the bottoms of the units and other brackets located in line with the first-mentioned brackets and connecting the upper surfaces of the pans with the tops of the units, said last-mentioned brackets projecting through the screens, substantially as described.

3. The combination with a receptacle containing cooling liquid, of a high-proof spirit-distilling column submerged in the liquid of the receptacle and consisting of a plurality of super-imposed units, each unit consisting of a concavo-convex bottom, a flat top, a concavo-convex pan above the bottom and concentric therewith, a screen over the pan, devices connecting the pan with the bottom and with the top, whereby the latter are braced against pressure from without and the pan spaced from both the top and the bottom, the bottom of each unit connected with the top of the unit below, and a manifold pipe having branch pipes connecting the same with all of said pans, substantially as described.

4. The combination with a receptacle containing cooling liquid, of a high-proof spirit-distilling column submerged in the liquid of the receptacle and consisting of a plurality of super-imposed units, each unit consisting of a concavo-convex bottom, a flat top, a concavo-convex pan above the bottom and concentric therewith, a screen over the pan, devices connecting the pan with the bottom and with the top, whereby the latter are braced against pressure from without and the pan spaced from both the top and the bottom, the bottom of each unit connected with the top of the unit below, a manifold pipe having branch pipes connecting the same with all of said pans, and vertical bars supported on the bottom of the receptacle and connected to each unit of the column, substantially as described.

5. A column of the character described, comprising a vertical series of super-imposed units, each unit consisting of a concavo-convex bottom, a flat top having its edge bent over the edge of the bottom, a concavo-convex band located in the chamber formed by the top and the bottom, straps connecting the pan at its edges with the bottom, brackets connecting the pan with the top and with the bottom, and a screen over the pan, each of said pans having a drain pipe communicating with a common manifold, substantially as described.

In testimony whereof I have signed my name to this specification in the presence of two subscribing witnesses.

PHILIP PUBLICKER.

Witnesses:
 CHAS. E. POTTS,
 M. E. DITTUS.